United States Patent [19]

Avilla

[11] Patent Number: 4,485,860

[45] Date of Patent: Dec. 4, 1984

[54] FORMING A CYLINDRICALLY SHAPED HOLE IN A LAMINATED WOODEN BEAM

[75] Inventor: Kenneth J. Avilla, Santa Rosa, Calif.

[73] Assignee: Standard Structures, Inc., Windsor, Calif.

[21] Appl. No.: 470,224

[22] Filed: Feb. 28, 1983

[51] Int. Cl.³ .............................................. B27D 1/00
[52] U.S. Cl. .................................... 144/350; 144/365; 156/257
[58] Field of Search ............... 144/345, 365, 92, 93 R, 144/93 A, 350; 156/153, 257

[56] References Cited

U.S. PATENT DOCUMENTS

| | | | |
|---|---|---|---|
| 419,558 | 1/1890 | Reeves | 144/365 X |
| 2,301,800 | 11/1942 | Bersie | 144/365 |

Primary Examiner—W. D. Bray
Attorney, Agent, or Firm—Limbach, Limbach & Sutton

[57] ABSTRACT

A process for forming a cylindrically shaped hole in a laminated wooden beam comprised of two or more individual wooden members. Prior to laminating the individual wooden members, the location of the cylindrically shaped hole is established. A pilot bore is then made in the wooden member established by the desired location of the cylindrically shaped hole and the individual wooden members are laminated such that the pilot bore is located proximate the interface of adjacent individual wooden members at the location determined by the to-be-formed cylindrically shaped hole. The hole is then formed by guiding a drill bit in a path established by the pilot bore.

8 Claims, 4 Drawing Figures

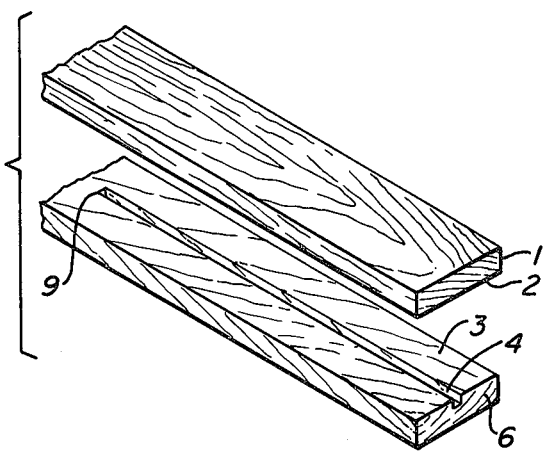
FIG._1.
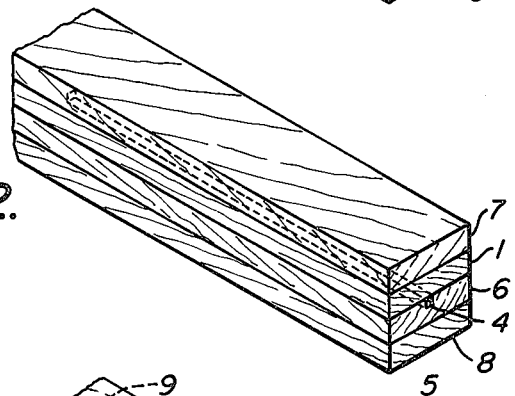
FIG._2.
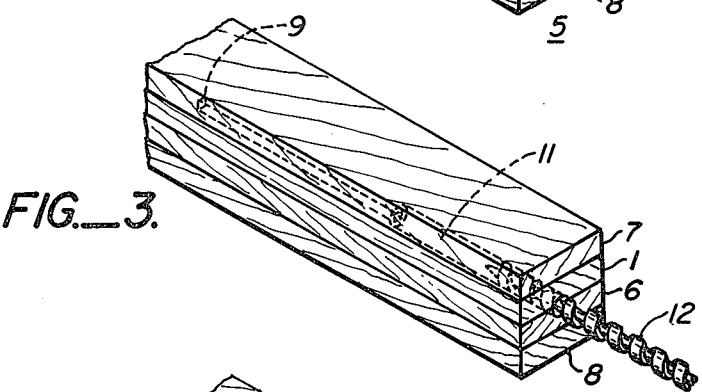
FIG._3.
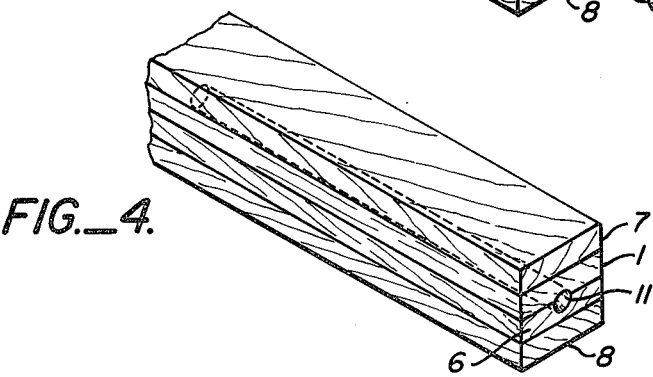
FIG._4.

FORMING A CYLINDRICALLY SHAPED HOLE IN A LAMINATED WOODEN BEAM

DESCRIPTION BACKGROUND ART

It has been commonplace for quite some time to produce laminated wooden beams for various structural purposes. Such structural members being characterized as having extremely strong shear and bending strengths have been used as beams, arches, trusses, columns, joists and girders.

The laminated wooden beams described above are generally constructed of rectangularly shaped sawn lumber, which are laminated to one another by gluing individual members and contacting said members with one another under high pressure to set the glue. The individual laminations are longitudinally disposed, thus possessing adjacent bonded surfaces running throughout the longitudinal dimension of the composite laminated member.

Although the composite member is ideally suited as a structural support, it has been found to be quite difficult, if not impossible, to establish a drilled hole within the body of the laminated beam along its longitudinal axis with any degree of precision. This is particularly true when the drilled hole is attempted to be made at the interface of adjacent individual wooden members due primarily to the presence of cured glue or adhesive. Growth characteristics of the wood such as knots, grain angle varying wood density, which are not symetrical to the axis of the bore, presents a substantial obstacle to the drilling of a cylindrically shaped hole at a precise predetermined location.

The desire for the establishment of cylindrically shaped holes within laminated wooden members formed with a degree of predetermined precision has been well recognized within the industry. For example, laminated wooden members, when used as trusses and girders, have occasionally been called upon to tie into still other similar structural members. This tie-in can be accomplished by setting a threaded member within the laminated wooden beam which thus can be threadably engaged with another structural member as a means of attachment. However, due to the problems outlined above in establishing a cylindrically shaped hole along the longitudinal direction of the laminated wooden beam as a receiving hole for the threaded member, the use of laminated wooden beams has been restricted as structural supports.

It is thus an object of the present invention to overcome the problems and difficulties outlined above.

It is yet another object of the present invention to establish a cylindrically shaped hole along the longitudinal axis of a laminated wooden beam with a degree of precision and accuracy unachievable by employing prior art techniques.

These and further objects of the present invention will be more fully understood and appreciated when considering the following description and appended drawings wherein:

FIGS. 1–4 are perspective views of various stages of the process claimed as applicant's invention.

DISCLOSURE OF INVENTION

A process is disclosed for forming a cylindrically shaped hole in a laminated wooden beam comprised of two or more individual wooden members. Prior to laminating the individual wooden members, the location of the cylindrically shaped hole is established. A pilot bore is then made in the wooden member established by the desired location of the cylindrically shaped hole and the individual wooden members are laminated such that the pilot bore is located proximate the interface of adjacent individual wooden members at the location determined by the to-be-formed cylindrically shaped hole. The hole is then formed by guiding a drill bit in a path established by the pilot bore.

BEST MODE FOR CARRYING OUT THE INVENTION

In referring to FIG. 1, several processing steps in carrying out the present invention are shown. For instance, prior to that stage in the process depicted by FIG. 1, the location of the later to-be-formed cylindrically shaped hole has been chosen. At that location, a pilot bore 4 has been made in individual wooden member 6 to a length bounded at 9 by, for instance, the use of a commonly available router. Pilot bore 4 is intended to have a cross-sectional area significantly smaller than the cross-sectional area of the later cylindrically shaped hole 11 (FIG. 4). Ideally, the diagonal dimension of the square pilot bore shall be less than or equal to the diameter of the cylindrically shaped hole.

After pilot bore 4 has been constructed, the individual wooden members 1 and 6 are laminated at surfaces 2 and 3. This can be done by gluing rectangularly shaped members 1 and 6 under high pressure to form a composite laminated wooden beam 5 (FIG. 2) constructed, for example, of individual wooden members depicted as commonly available 2×4's 7, 1, 6 and 8.

Certain advantages in practicing the present invention are clearly evident even in considering the early stages of fabrication. For example, pilot bore 4 can be constructed by use of an ordinary router whereby an open groove is established, the fourth side of which being bounded by surface 2 of individual wooden member 1. Such a groove is considerably easier to cut with precision than is an enclosed cylindrical hole.

Next, the pilot bore is shown being constructed prior to the lamination of the individual wooden members making up the laminated wooden beam. It is known that the hardened glued seam represents a substantial obstacle to the ability to accurately drill a longitudinal hole along the seam with any degree of precision. The pilot bore provides an accurate guide for drill bit 12 (FIG. 3) to provide the formation of a cylindrically shaped bore 11 with a degree of accuracy unattainable in the prior art.

As best seen by FIGS. 3 and 4, the pilot bore 4 is generally configured to a length along the longitudinal axis of the laminated wooden beam a distance approximately equal to the intended depth of the cylindrically shaped hole 11. As further shown, because the pilot bore provides a guide for drill bit 12, the geometric center of the cross-section of pilot bore 4 substantially coincides with the geometric center of cylindrically shaped hole 11.

While a detailed description of the basic process and product has been described above, it is understood that other changes and modifications may be made within departing from the spirit of the invention. All such modifications are intended to be included within the scope of the appended claims.

I claim:

1. A process for forming a cylindrically shaped hole in a laminated wooden beam comprised of two or more individual wooden members comprising:
   A. selecting the location of the cylindrically shaped hole prior to laminating the individual wooden members;
   B. forming a pilot bore in one of the wooden member established by the desired location of the cylindrically shaped hole, said pilot bore being characterized as having a cross-sectional area smaller than the cross-sectional area of the cylindrically shaped hole;
   C. laminating said individual wooden members such that said pilot bore is located proximate the interface of adjacent individual wooden members at the location determined by the to-be-formed cylindrically shaped hole; and
   D. forming the cylindrically shaped hole by guiding a drill bit in a path established by the pilot bore.

2. The process of claim 1 wherein the pilot bore diagonal dimension is less than or equal to the diameter of the cylindrically shaped hole.

3. The process of claim 1 wherein the axis of the pilot bore is substantially parallel to the longitudinal axis of the laminated wooden beam.

4. The process of claim 1 wherein said pilot bore possesses a substantially square cross-section.

5. The process of claim 1 wherein said pilot bore is established to a longitudinal length approximately equal to the length of the cylindrically shaped hole.

6. The process of claim 1 wherein the laminated wooden beam comprises two or more rectangularly shaped wooden members which have been glued together along their longitudinal axes.

7. The process of claim 4 wherein three sides of the square are defined by a first wooden member in which the pilot bore is formed while the fourth side is established by the adjacent wooden member laminated to the first wooden member.

8. The process of claim 1 wherein the geometric center of the cross-section of said pilot bore substantially coincides with the geometric center of the cross-section of said cylindrically shaped hole.

* * * * *